Patented Dec. 1, 1931

1,834,056

UNITED STATES PATENT OFFICE

FRIEDRICH WILHELM GUTHKE AND WILHELM PUNGS, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

TREATMENT OF MONTAN WAX

No Drawing. Application filed January 17, 1928, Serial No. 247,454, and in Germany January 21, 1927.

Owing to its high content of free organic acids, Montan wax which has been bleached by treatment with oxidizing agents, such as chlorine, chromic acid, air in the presence of nitric acid and the like, has a tendency to crystallize when used for example in boot polishes, floor polishes and other similar articles.

We have now found that this difficulty is overcome if the carboxyl groups (—COOH) of the free organic acids present in the bleached Montan wax are completely or partially converted into salts, or into other groups containing the —CO— group and which do not contain a carboxyl hydrogen atom. For example, the acids may be converted into their alkali metal or alkaline earth metal salts (which are equivalents for the purposes of the present invention) or a mixture of both, or they may be completely or partially esterified with alcohols, such as ethyl alcohol, ethylene- or butylene-glycol, glycerol, butanol and the like, or completely or partially converted into amides or their substitution products, or into ketones, anhydrides and the like.

A Montan wax possessing particularly favourable properties results from the mixture obtained by converting a portion of the free organic acids in the wax into esters, for example by treatment with alcohols or alcohol mixtures, and the remaining portion either wholly or in part into salts, or mixtures thereof, for example by the action of an alkali or an alakline earth hydroxid. The operation is conducted, either by first partially esterifying the product with an alcohol, such as glycerol, and then converting the major portion of the residual organic acids into salts by the addition of a little alkaline earth metal hydroxid, or a mixture of alkali and an alkaline earth metal hydroxid, or by reversing the order of procedure.

It is often advisable to esterify the acids with different alcohols, such as a mixture of glycol and butanol, and also to prepare mixed metallic salts.

For special purposes, two or more of such compositions may be incorporated together by fusion. A wax with excellent polishing properties is obtained, for example, by mixing a calcium-zinc-glycerol ester wax with a calcium-amyl-ester wax.

When employed for example in boot polishes and the like, the wax obtained according to the present invention has a very good capacity for fixing oil of turpentine and other solvents and diluents, such as are used in their manufacture, and can be stained with the usual dyestuffs without these dyestuffs having any tendency to separate therefrom. Further a very rich gloss is easily obtained with black oil boot polishes, which have been prepared from the said waxes.

The mixtures forming the resulting new waxes have no tendency to crystallize, and they further have the advantage of being readily emulsified.

The following examples will further illustrate the nature of the said invention which however is not limited thereto. The parts are by weight.

Example 1

100 parts of Montan wax, bleached with chromic acid, are treated at from 110° to 120° C. with a solution of 2 parts of sodium carbonate or caustic potash in 5 parts of water, until all the water has evaporated. The wax obtained shows no tendency to crystallize and forms homogeneous preparations when used, for example, in shoe creams, floor polishes and other articles.

Example 2

100 parts of Montan wax bleached with chromic acid are heated in an autoclave to about 200° C., with 25 parts of glycerol, until the latter has been, at least partially esterified. The product obtained may be employed for the same purposes as that obtained according to Example 1, and also shows no tendency to crystallize.

Example 3

Montan wax is heated for five hours to a temperature of 200° C. in an autoclave with gaseous ammonia, the organic acids contained in the wax being thereby converted into acid amides. The product obtained is excellently adapted for the preparation of boot polishes, floor polishes and similar articles.

*Example 4*

100 parts of highly bleached Montan wax are mixed with 8 parts of glycol and maintained at 140° C. for several hours. 2 parts of calcium hydroxid are then stirred into the melt, and stirring is continued, a temperature of from 130 to 140° C. being maintained, until the initially cloudy melt has again clarified. The product thus obtained furnishes boot polishes which give an extremely rich gloss.

What we claim is:

1. The process for the production of an improved bleached Montan wax, which comprises converting at least part of the carboxyl groups of the free organic acids present in the bleached Montan wax into groups containing the —CO— group but which do not contain a carboxyl hydrogen atom.

2. The process for the production of an improved bleached Montan wax, which comprises converting at least part of the free organic acids present in the bleached Montan wax into salts.

3. The process for the production of an improved bleached Montan wax, which comprises converting at least part of the free organic acids present in the bleached Montan wax into salts by the action of alkali.

4. The process for the production of an improved bleached Montan wax, which comprises converting at least part of the free organic acids present in the bleached Montan wax into a mixture of salts by the action of an alkali and an alkaline earth metal hydroxid.

5. The process for the production of an improved bleached Montan wax, which comprises converting at least part of the free organic acids present in the bleached Montan wax into esters by the action of an alcohol.

6. The process for the production of an improved bleached Montan wax, which comprises converting at least part of the free organic acids present in the bleached Montan wax into a mixture of esters by the action of several alcohols.

7. The process for the production of an improved bleached Montan wax, which comprises converting part of the free organic acids present in the bleached Montan wax into salts and another part into esters.

8. The process for the production of an improved bleached Montan wax, which comprises converting part of the free organic acids present in the bleached Montan wax into salts and another part into esters by treating the said bleached Montan wax first with glycol and then with calcium hydroxid.

9. As a new article of manufacture bleached Montan wax in which at least part of the carboxyl groups of the organic acids has been converted into a group containing the —CO— group and which does not contain a carboxyl hydrogen atom.

10. As a new article of manufacture bleached Montan wax in which at least part of the carboxyl groups of the organic acids has been converted into salts.

11. As a new article of manufacture bleached Montan wax in which at least part of the carboxyl groups of the organic acids has been converted into esters.

12. As a new article of manufacture bleached Montan wax in which at least part of the carboxyl groups of the organic acids has been converted partly into salts and partly into esters.

13. As a new article of manufacture bleached Montan wax in which at least part of the carboxyl groups of the organic acids has been converted partly into a calcium salt and partly into a glycol ester.

In testimony whereof we have hereunto set our hands.

FRIEDRICH WILHELM GUTHKE.
WILHELM PUNGS.